Patented May 21, 1929.

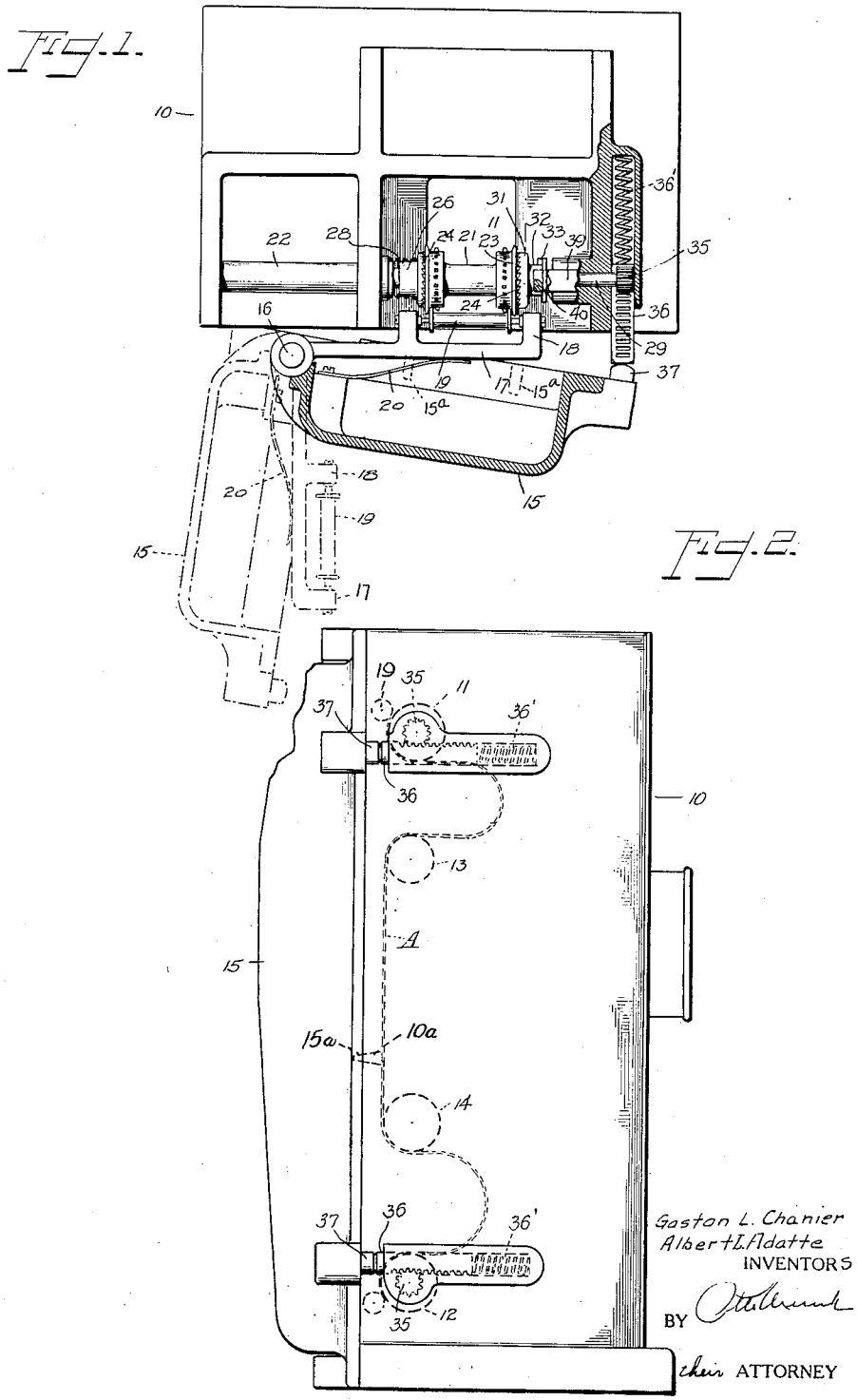

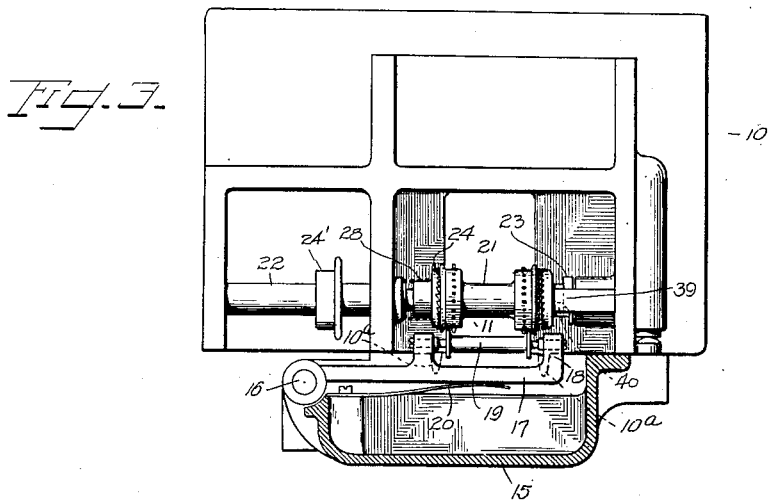
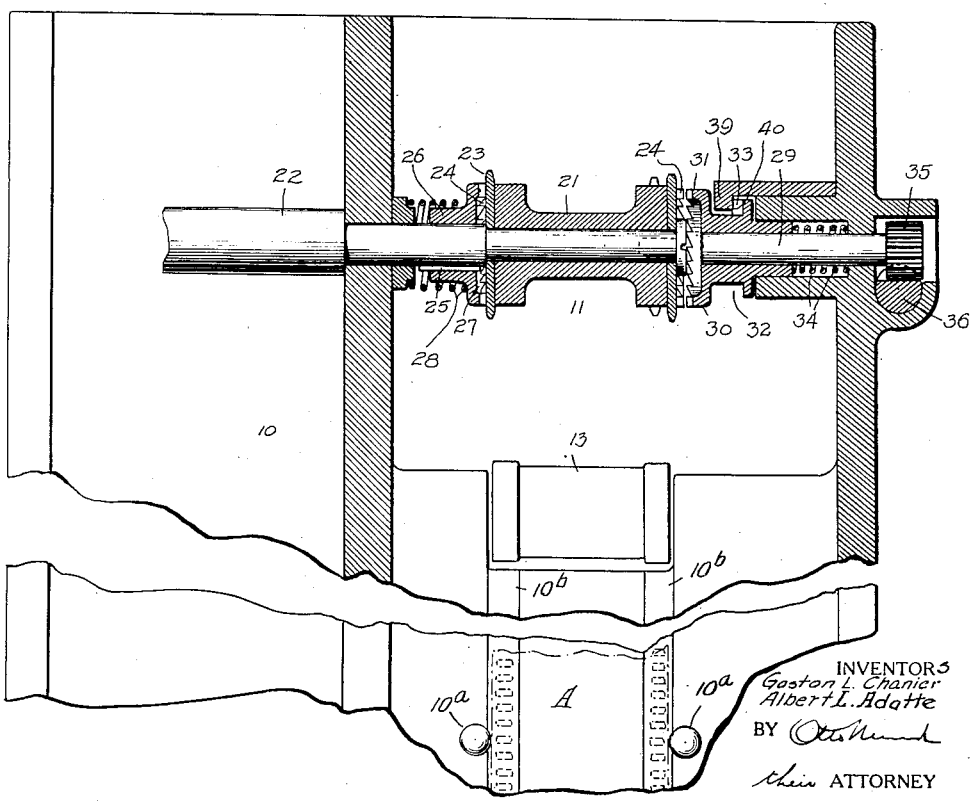

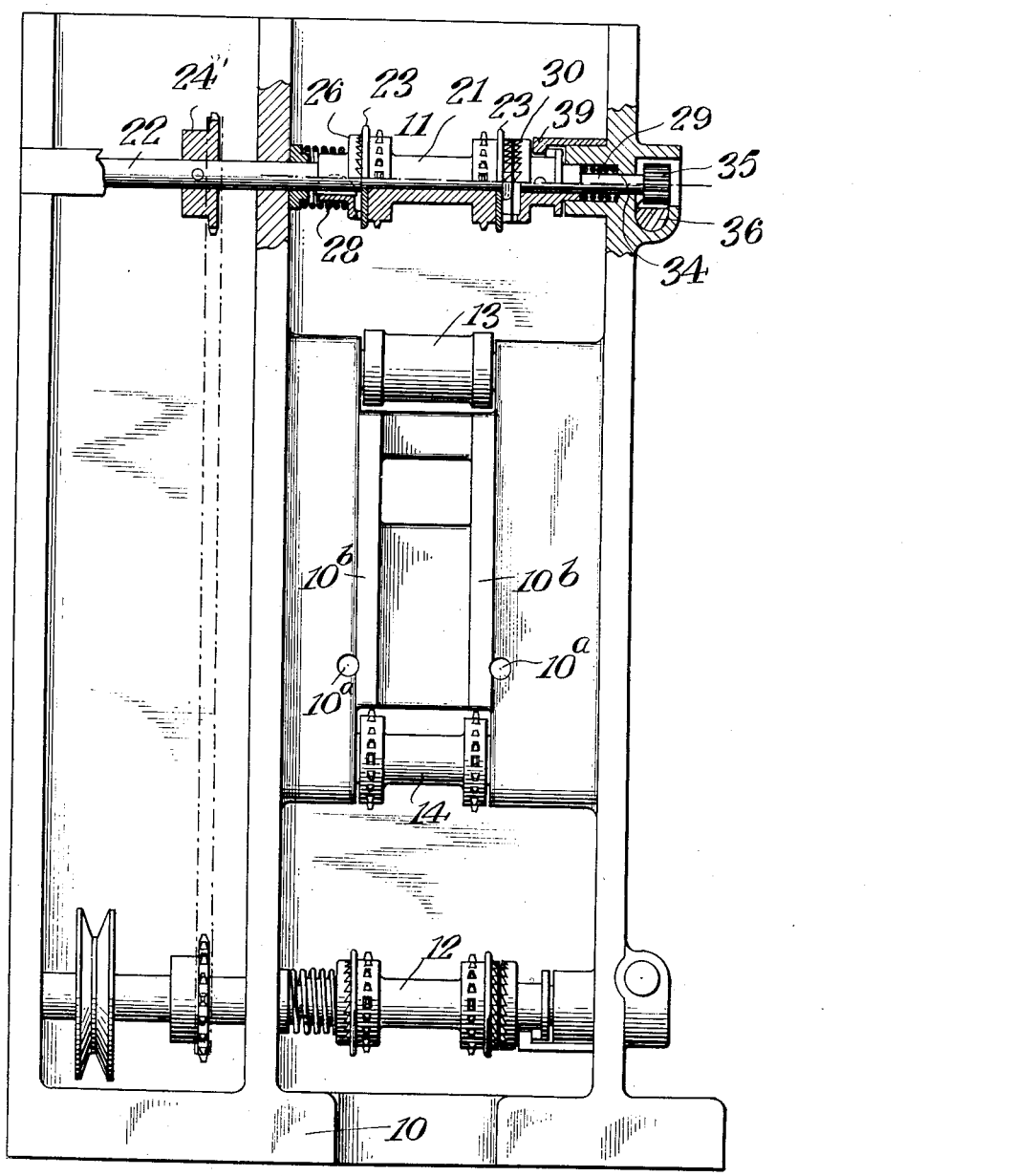

1,714,461

UNITED STATES PATENT OFFICE.

GASTON L. CHANIER, OF JERSEY CITY, AND ALBERT L. ADATTE, OF BOUNDBROOK, NEW JERSEY, ASSIGNORS TO PATHE EXCHANGE, INC., OF NEW YORK, N. Y., A CORPORATION OF NEW YORK.

AUTOMATIC LOOP-FORMING DEVICE.

Application filed November 6, 1926. Serial No. 146,639.

This invention relates to improvements in an automatic loop setting arrangement for motion picture apparatus, and has for its principal object to provide a device of this character adapted to automatically form the upper and lower loops of the film.

A further object of the invention is to utilize the motion of closing the door of the apparatus to operate the elements engaged to advance the film in the loop setting operation.

We accomplish these objects by means of the arrangement and combination of parts illustratively exemplified in the accompanying drawings, in which, Figure 1 is a top plan view of a motion picture apparatus showing the main door in cross section and in position to form the loop; Figure 2 is a side elevational view of the apparatus with main door in closed position and the loop formed; Figure 3 is a view similar to Figure 1 except that the main door is in closed position; Figure 4 is a substantially longitudinal sectional view of one of the film sprockets and elements engaged in the function outlined; and Figure 5 is a full rear view of the apparatus with main door and film gates removed showing the arrangement of the sprockets and clutch members.

Briefly, the invention comprises a motion picture apparatus of any well known type used in connection with the taking or projection of motion picture film, and means for setting the loop of the film by the simple closing motion of the main door, which operates to revolve the film sprockets sufficiently to withdraw film from both delivery and take up magazines to form the loops.

Referring to the drawing, 10 denotes a standard form of motion picture apparatus comprising a metal head in which are disposed the upper feed 11 and lower feed 12 for the film A, the latter operating downwardly from an upper magazine, not shown, over the upper and lower feeds 11 and 12 to a receiving magazine, also not illustrated.

Situated intermediate the upper and lower feeds 11 and 12 and above and below the optical axis of the apparatus are the roller 13 and sprocket 14, the latter of which is intermittently rotated to move the film step by step past the optical axis of the machine. The dispositions of the loops are between each feed and the adjacent sprockets, as illustrated in dotted lines in Figure 2. The means and manner in which the sprockets operate is well known and need not be described in detail here.

As usual in apparatus of this character one side of the head is capable of being opened to accommodate the threading operation of the film. In the present embodiment the rear of the apparatus is the side which may be opened to receive the film. A main door 15 is employed to close the opening and comprises a member hinged at one side on an upright bolt 16 carried by lugs on the casing. If desirable the main door 15 may be constructed in sections for the purpose of facilitating application and removal of the film, but for the sake of clearness the main door is illustrated as an integral unit. In order that the film A may be properly located on the feed sprockets 11 and 12 before the main door is closed, we provide a film gate 17, which comprises a member hinged on the upright bolt 16 and having outstanding parallel arms 18 between which idler rollers 19 are mounted to engage the feed sprockets 11 and 12 outside of their sprocket teeth. The film gate 17 operates entirely independently of the main door except for a flat spring 20 carried by the inner wall of the main door adjacent the hinged axis thereof and adapted to yieldably engage the film gate 17, adjacent its outer end, so as to move the gate to closed position before the main door 15 is moved to its complete closed position, as illustrated in Figure 1.

Thus far we have described a device unlike the usual apparatus in small details only and we might point out further that to load such an apparatus the film A is merely led in from the upper magazine and placed over sprockets 11 and roller 13 and then over sprockets 12 and 14 to be finally attached to the reel in the receiving magazine. At this stage the film is held loose throughout its position in the machine and awaits the forming of the loops before the machine may be operated.

In order that the operator may simply thread the film A over the apertured head 10, we provide the latter with spaced guide pins $10^a$ which are disposed just outside of the guideways $10^b$ below the aperture. Each pin $10^a$ is conically shaped so as to receive the sides of the film and guide it towards the guideways 10^b. The main door 15 is provided with sockets or openings 15^a which register with and receive the pins 10^a when the door is moved to closed position over the film A and its gate 17.

The loop forming operation is performed by the feed sprockets 11 and 12, illustratively exemplified in Figure 5, and since each sprocket and its associated parts are substantially the same it will suffice to give a detailed description of but one set of these elements, the only difference being that the loop forming device adjacent the takeup reel is intended to operate in the opposite direction from that of upper loop forming device. It will be understood that since the lower sprocket acts against the pull of the film and the loop being formed above the sprocket, the teeth of the clutch member are disposed in the opposite direction.

The sprocket 11, comprising a spool 21 having toothed flanges at opposite ends, is loosely mounted on the end of a driven shaft 22 projecting part way through the width of the head, the shaft bearing in the upright walls of the same. Attached to the flanges of the spool are disc guide plates 23 having their outer surfaces provided with an annular row of radially disposed beveled teeth 24. Under ordinary running conditions the shaft 22 is rotated in anti-clockwise direction through a driving connection on a sprocket 24^1 fixed on the shaft. Slidably carried by the shaft 22 over a key way 25 is a clutch plate or disc 26 having beveled teeth 27 opposed to those of the adjacent guide plate 23. The teeth 27 of the clutch are normally held in engagement with those of the guide plate 23 by means of a coiled spring 28 embracing the shaft and portions of the clutch and tending to exert a yielding pressure against the clutch member 26 in the direction of the spool. Through the clutch and guide plate 23 the film A is constantly being fed to the roller 13 over the spool 21.

Coaxially alined with the axis of the shaft 22 is a second stub shaft 29 supported in the outside wall of the head and having its inner end provided with a clutch member 30 adapted to be brought into engagement with the adjacent end of the spool 21. The clutch member 30 comprises an annular toothed flange 31, the teeth of which are formed to mesh with the teeth 24 of the guide plate 23. The clutch on its opposite face is provided with a flanged collar 32, the inner face of the flange having a cam projection 33. The shaft 29 is adjustable longitudinally thereof a distance equal to the depth of the clutch teeth 24 and the said shaft is yieldably held in the direction of the spool 21 by means of a coil spring 34. The normal tendency of the spring 34 is to engage the clutch teeth with those of the spool when the door is open and the film is not moving. Advance movement of the sprocket 11 independently of the shaft 22 is brought about by rotary movement of the shaft 29 which projects through the outer wall of the casing and into a chamber formed by a projecting portion of the wall. The end of the shaft 29 carries a pinion 35, which is in mesh with the teeth of a rack 36, the latter being adjustable longitudinally thereof and at right angles to the shaft 29. The rack 36 is supported in the chamber at the side of the wall and its free end projects outwardly from the rear of the machine and in the path of a bolt 37 projecting from the inside face of the main door so that when the door is closed the bolt 37 engages the end of the rack 36 and causes it to project into the chamber with a result that the pinion 35 is rotated. A spring 36' arranged in the chamber tends normally to project the rack. The clutch member 30 being normally in mesh with the spool 21, the rotation of the shaft 29 imparts a similar rotary movement to the spool in a direction to unwind film from the upper magazine, and as a consequence the film is looped up between the sprocket 11 and the adjacent roller 13, as illustrated in Figure 2.

The size of the loop of film formed is determined by the distance the rack moves over the pinion 35 and also by a disengaging arrangement for the clutch member 30. The clutch member 30 as previously mentioned is provided with a collar having the cam surface 33, which, when rotated with the shaft 29 and clutch 30, is brought into engagement with a fixed cam plate 39 having its cam surface 40 disposed in the path of the cam surface 33 and designed to cause the latter and consequently the clutch 30 to ride outwardly away from the spool 21, a distance sufficient to disengage their teeth. It will be seen that the projection of the rack caused by closing the main door effects rotation of the spool 21 to set the loop and near the end of the rotary movement disengages the clutch 30 and spool. The beveled sides of the teeth of the clutch member or plate 26 and spool on the driving end of the latter enable the spool to rotate independently of the plate 26, which simply rides out on the teeth against the spring 28.

In operation, the operator has simply to thread the film over the guide pins 10^a in the manner described after which the door is closed and the spools 21 rotated sufficiently in opposite directions to set the loops. By the time the loops have been set the clutch members 30 have been completely withdrawn from their connection with the spools which are free to rotate through their connection with the clutch members 26.

Should either of the upper or lower loops or both become taut they may be again formed by simply opening the door sufficiently to allow the racks 36 to project and then closing the same to repeat the operation just described.

It will be clear that the present invention is not limited to a loop setter operated entirely by the closing operation of the main door, since the racks may be manipulated just as readily by merely pushing them inwardly to rotate the spools.

What we claim as new and desire to obtain by Letters Patent is:—

1. In a motion picture machine, a casing, upper and lower rotary feed shafts arranged in the casing, feed film sprockets loose on said shafts, clutches keyed on the shafts and yieldably adjustable longitudinally thereof to engage and rotate the sprockets in one direction, rotary shafts coaxially alined with the feed shafts and supported in the casing at one side thereof, clutch members for the second set of shafts yieldably urged in the direction of the feed sprockets to engage the latter, means operating from the outside of the casing to rotate the shafts and last named clutches, and means operating on the latter clutches to shift them axially of their shafts and away from the sprockets during rotary movement of the said clutches.

2. In a motion picture machine, a casing having one side at least closed by a door, rotary film feed sprockets arranged in said casing, clutch means operating axially and in rotary direction to first rotate and then release connections with the sprockets for setting the loops, and means operating to rotate the clutch means and disposed in the path of movement of the door, whereby the closing operation of the latter will rotate the sprockets to set the film loops.

3. In a motion picture machine, a casing having one side at least closed by a door, a rotatable sprocket supported in the casing, a film gate yieldably held in closed position against the film by pressure from the door, and means operating by the closing movement of the door to rotate the sprocket for forming a loop of film between the sprocket and the gate.

4. In a motion picture machine, a casing having one side at least closed by a door, a rotatable sprocket supported in the casing, comprising a spool having beveled clutch teeth on opposite ends, a driven clutch yieldably held in engagement with the teeth on one end of said spool and adapted to revolve the latter in one direction, a clutch having rotary and axial movement and yieldably urged in the direction of the teeth at the other end of said spool, means for rotating and axially moving said second clutch, comprising a shaft projecting through the casing and keyed to the second clutch at one end, a pinion carried by the opposite end, and a rack in mesh with the pinion and yieldably held in projected position in the path of the closing movement of the door for being retracted when the door is closed to rotate the clutch and spool to set a loop in the film.

5. In a motion picture machine, a casing having one side at least closed by a door, a rotatable sprocket supported in the casing, rotary clutch members yieldably engaging opposite ends of the sprocket to rotate the same in one direction, one of said clutch members being provided with a cam projection, a fixed cam carried by the casing and disposed in the path of the clutch cam to cause the clutch to disengage from the sprocket during rotary movement thereof, and means operating to rotate the clutch by the closing operation of the door.

6. In a motion picture machine, a casing having at least one side closed by a door, a rotary feed shaft arranged in the casing, a rotary and axially adjustable clutch shaft coaxially alined with the feed shaft, a feed sprocket loose on said feed shaft, a clutch member carried by the feed shaft and yieldably held in engagement with the sprocket, a second clutch member fixed on the clutch shaft and yieldably held in engagement with the sprocket, a rack and pinion connection with the clutch shaft operating to rotate the clutch shaft by closing operation of the door, and a cam arrangement operating to retract the clutch shaft and clutch during rotary movement thereof to set the film loop.

7. In an apparatus of the class described, a body portion having a guideway for a film, and conical guide pins in the sides of the guideway for facilitating the threading of the film in the guideway.

8. In an apparatus according to claim 7, a pivoted door for closing over the guideway and film, said door having openings for the accommodation of the guide pins.

In testimony whereof we affix our signatures.

GASTON L. CHANIER.
ALBERT L. ADATTE.